Figure 1:
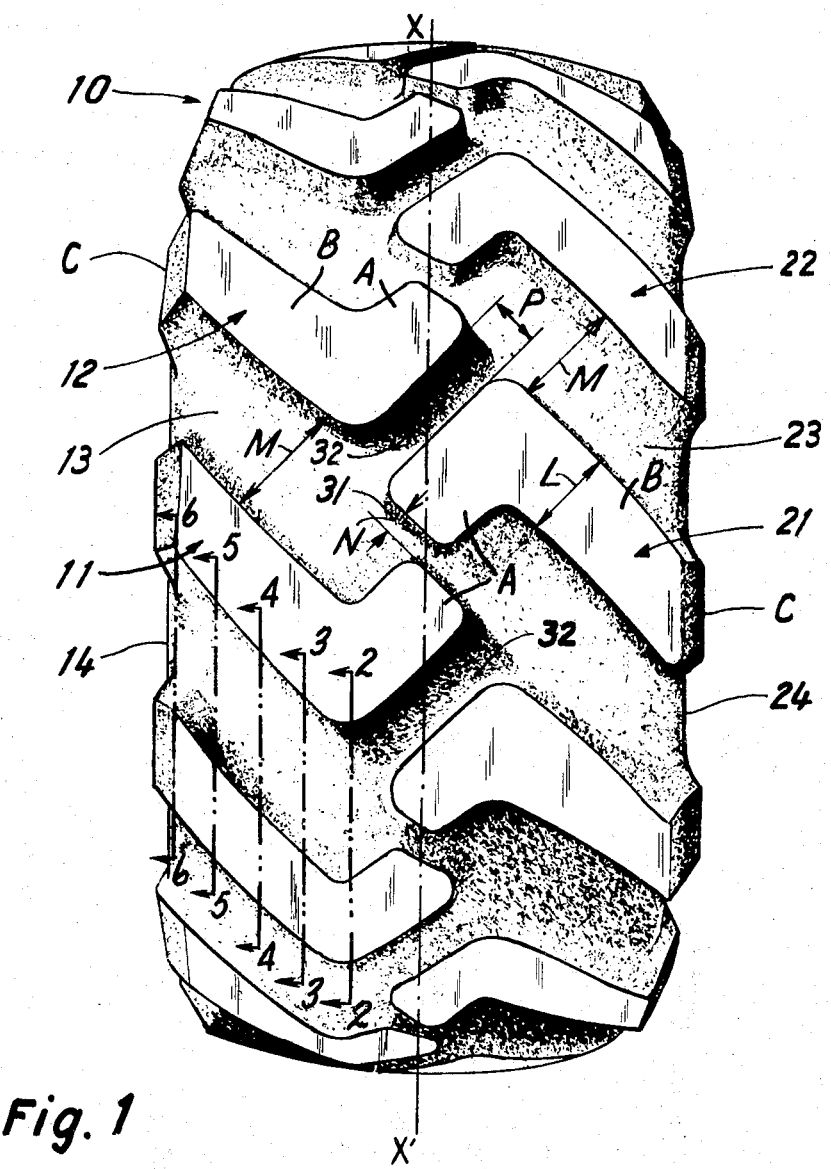
Figure 2:
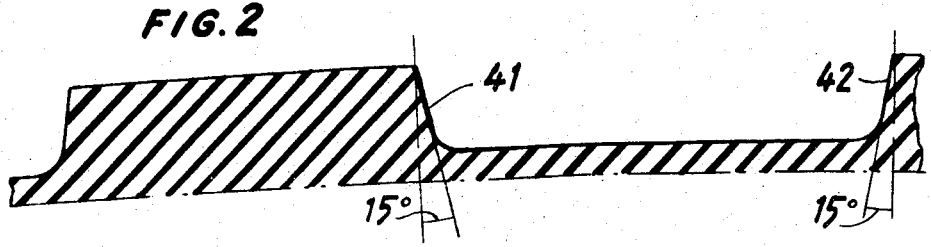
Figure 3:
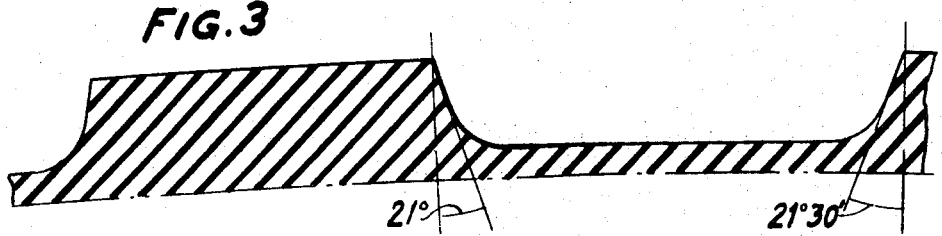
Figure 4:
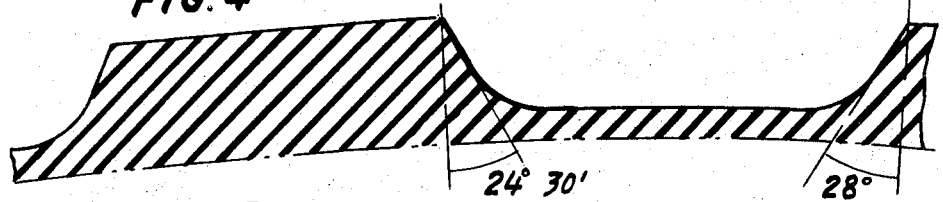
Figure 5:
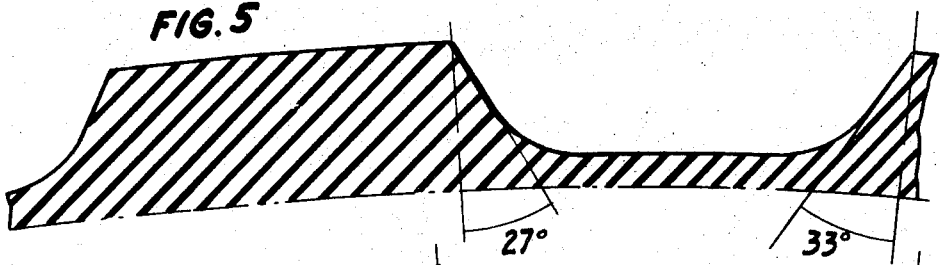
Figure 6:
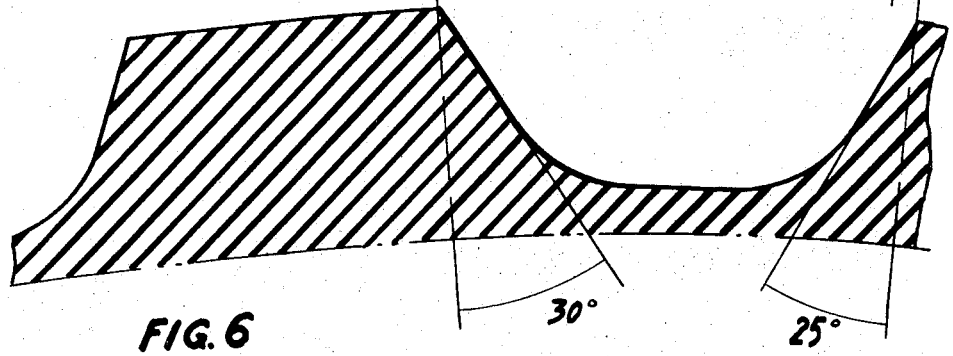

United States Patent [19]
Verdier

[11] 3,844,326
[45] Oct. 29, 1974

[54] HEAVY CONSTRUCTION VEHICLE TIRES
[75] Inventor: Henri Verdier, Beauregard-L'Eveque, France
[73] Assignee: Compagnie Generale Des Establissments Michelin, Raison Sociale Michelin & Cie, Clermont-Ferrand, France
[22] Filed: Mar. 23, 1973
[21] Appl. No.: 344,425

[30] Foreign Application Priority Data
Apr. 20, 1972 France .............................. 72.14099

[52] U.S. Cl. ............................................ 152/209 B
[51] Int. Cl. ............................................. B60c 11/04
[58] Field of Search ..................... 152/209 R, 209 B

[56] References Cited
UNITED STATES PATENTS
2,626,649  1/1953  Eiler et al. ........................ 152/209 B
3,547,175  12/1970  Verdier .......................... 152/209 B
3,603,370  9/1971  Hylbert .......................... 152/209 B

*Primary Examiner*—Drayton E. Hoffman
*Attorney, Agent, or Firm*—Brumbaugh, Graves, Donohue & Raymond

[57] ABSTRACT

Tires for heavy construction vehicles, such as graders, having the properties of excellent adherence to movable earth, automatic expulsion of the earth retained in the tread recesses and high resistance to impact and cuts are achieved by means of a tread design having two adjacent oppositely oriented rows of L-shaped relief elements arranged so as to form wide lateral recesses between their adjacent long arms forming the lateral portions of the tread and narrow central grooves between their adjacent short arms forming the central portion of the tread.

9 Claims, 6 Drawing Figures

HEAVY CONSTRUCTION VEHICLE TIRES

The present invention relates to improvements in new or recapped tires intended to equip heavy construction vehicles. More particularly, it concerns the design of the tread.

As is known, the design of the tread of the tire of a heavy construction vehicle must be adapted to the conditions for the use of the vehicle on which it is to be employed. Depending on the type of vehicle, predominance will be given to one or another quality. The present invention, by a suitable design and distribution of the elements in relief and of the recessed elements of the tread, seeks to obtain to a high degree the qualities desirable in tires for graders or similar vehicles, and in particular:

excellent adherence to movable earth, even in case of a large inclination of the axis of the wheel to the horizontal;

automatic expulsion of the earth retained in the recesses;

high resistance to impacts and cuts.

The tire which satisfies the object of the invention and the tread of which is composed of two adjacent rows of L-shaped relief elements which succeed each other in the circumferential direction alternately in one row and then in the other row, the long arms of the L-shaped relief elements forming the lateral portions and the short arms of the L-shaped relief elements forming the central portion of the tread, the L-shaped relief elements having their respective arms parallel but being oriented in opposite direction from one row to the other row, is characterized by the fact that the L-shaped relief elements are arranged so as to form wide lateral recesses between their adjacent long arms and narrow central grooves between their adjacent short arms.

In accordance with preferred arrangements:

a. the short and long arms of the L-shaped relief elements are arranged at an angle of about 45° to the circumferential direction;

b. each L-shaped relief element of one row is paired with an L-shaped relief element of the other row, their short arms being adjacent and separated from each other by a narrow central groove which is parallel to the bases of the short arms and has approximately the same length; the pairs of L-shaped relief elements which succeed each other in the circumferential direction are staggered with respect to each other; the adjacent short arms belonging to different pairs are not located in the extension of each other and are separated from each other by a narrow central groove which is parallel to the toes of the short arms;

c. the narrow central grooves separating the bases of the adjacent short arms have a width approximately one-half of the width of the short arms of the L-shaped relief elements and said narrow central grooves separating the bases of the adjacent short arms are wider than the narrow central grooves separating the toes of the adjacent short arms;

d. the long arms of the L-shaped relief elements have faces whose angle of taper increases from the center towards the edges of the tread so that the dimension of the lateral recesses, measured near the bottoms of the recesses and in the circumferential direction of the tire, decreases from the center towards the edges of the tread;

e. the long arms of the L-shaped relief elements, measured in the circumferential direction of the tire, have a dimension on the surface which decreases from the center towards the edges of the tread;

f. the dimension of the lateral recesses, measured in the circumferential direction of the tire, varies between about one times and about two times the aligned dimension, also measured in the circumferential direction of the tire, of the long arms of the L-shaped relief elements in accordance with the distance from the median plane and the depth at which the said recess dimension is measured;

g. the ends of the long arms of the L-shaped relief elements protrude laterally beyond the sidewalls of the tire;

h. the maximum width of the L-shaped relief elements, measured perpendicular to the direction of the arms, is between about 12 and 20 percent of the width of the tread.

The arrangements described have the effect of imparting favorable properties to the tread.

In particular, the wide lateral recesses which separate the adjacent long arms of the L-shaped relief elements result in extensive aggressiveness for the tread and confer upon it good adherence on movable earth; variations in width of the relief elements and of the recessed elements favor the expelling of the earth carried along by the tread; the small spacing of the relief elements in the central portion of the tread protects the latter from the aggression of the soil; the arrangement in associated, alternate herringbones also favors the cleaning of the recesses and improves the bearing surface density towards the center of the tread; and finally this simple design permits the use of economically manufactured molds.

The invention is illustrated by an embodiment which will be described with reference to the accompanying drawings in which:

FIG. 1 is a front perspective view of a tire in accordance with the invention and FIGS. 2 to 6 are partial circumferential sections on an enlarged scale at different distances from the median plane and taken on lines 2—2, 3—3, 4—4, 5—5 and 6—6, respectively, in FIG. 1.

The tread 10 shown in FIG. 1 is the tread of size 20.00—24 tire for use on graders. It comprises L-shaped relief elements, such as 11 and 12, forming a first row, and L-shaped relief elements, such as 21 and 22, forming a second row.

Each L-shaped relief element comprises three portions, namely a short arm A, a long arm B, and an end C. The short arm A of the relief element 11 or 12 is parallel to the short arm A of the relief element 21 or 22. The long arms B are arranged perpendicular to the short arms A. However, the right angles of the L-shaped relief elements face in opposite directions with respect to the relief elements 11 and 12 of one of the rows and with respect to the relief elements 21 and 22 of the other row.

In accordance with the invention, the relief elements 11, 12, 21 22 are arranged in such a way as to form between the long arms B of the adjacent relief elements 11 and 12 or 21 and 22 wide lateral recesses 13 or 23 whose width M, measured perpendicular to the long arms B, is at least equal to the width L of the long arms B, at least on the surface. On the other hand, between adjacent short arms A of the relief elements 11 and 21, or 21 and 12, there can be noted relatively narrow central grooves 31 and 32 whose widths N and P are substantially less than the width L of the long arms B.

It will be noted that the arms A and B of the relief elements 11, 12, 21, 22 are arranged approximately 45° to the circumferential direction or median plane XX'.

The relief elements 12 and 21 of opposite rows are furthermore paired, their short arms A being separated by a narrow central groove 32 parallel to the bases of the short arms A and of the same length. On the other hand, a stagger is present between the relief elements 11 and 21 or 12 and 22 whose short arms A are not located in the extension of each other. The central grooves 31 parallel to the toes of the short arms A are of definitely less width than the width of the central grooves 32 which are parallel to the bases of the short arms A. This arrangement favors both the closing of the lateral recesses 13 and 23 from the inner side and the articulating of the tread, and provides suitable variation in rigidity and mobility in the transverse direction as well as in the circumferential direction. Furthermore, it increases the density of bearing surface in the vicinity of the median plane.

As shown in FIGS. 2 to 6, the angle of taper of the faces 41 and 42 of the long arms B of the relief elements varies between 15° and 30° in the case of the former and between 15° and 33° in the case of the latter, while at the same time the dimensions in circumferential direction of the relief elements and of the lateral recesses are modified correlatively. As can be easily understood, the variation in shape and in size of the longitudinal section of the elements in relief and in recess modifies the local mobility and/or the rigidity.

The ends C of the relief elements 11, 12, 21 and 22 protrude laterally beyond the sidewalls 14 and 24 of the tire and thus provide protection against blows.

The arrangement described results in good adherence of the tire to movable earth due to wide lateral recesses 13 and 23, good protection against aggressions of the soil due to increased density and smaller spacing of the relief elements in the vicinity of the median plane; good cleaning of the recesses due to their special shape and their relative closure on the inner side. In the example described, the different arrangements cooperate in obtaining the said qualities to the highest extent.

What is claimed is:

1. In a construction vehicle tire whose tread is composed of two adjacent rows of L-shaped relief elements which succeed each other in the circumferential direction alternately in one row and then in the other row, the long arms of the L-shaped relief elements forming the lateral portions and the short arms of the L-shaped relief elements forming the central portion of the tread, the L-shaped relief elements having their respective arms parallel but being oriented in opposite direction from one row to the other row, the improvement which comprises said L-shaped relief elements being arranged so as to form wide lateral recesses between their adjacent long arms and narrow central grooves between their adjacent short arms, each L-shaped relief element of one row being paired with an L-shaped relief element of the other row, their short arms being adjacent and separated from each other by a narrow central groove which is parallel to the bases of the short arms and has approximately the same length.

2. The tire as defined by claim 1 wherein the short arms and the long arms of the L-shaped relief elements are arranged at an angle of about 45° to the circumferential direction.

3. The tire as defined by claim 1 wherein the pairs of L-shaped relief elements are staggered with respect to each other, with short arms overlapping the extensions of the adjacent short arms of different pairs and being separated from each other by a narrow central groove which is parallel to the toes of the short arms.

4. The tire defined by claim 3 wherein the narrow central grooves separating the bases of the adjacent short arms have a width approximately one-half of the width of the short arms of the L-shaped relief elements and said narrow central grooves separating the bases of the adjacent short arms are wider than the narrow central grooves separating the toes of the adjacent short arms.

5. The tire defined by claim 1 wherein the long arms of the L-shaped relief elements have faces whose angle of taper increases from the center towards the edges of the tread.

6. The tire defined by claim 5 wherein the long arms of the L-shaped relief elements measured in the circumferential direction of the tire, have a dimension on the surface which decreases from the center towards the edges of the tread.

7. The tire defined by claim 6 wherein the dimension of the lateral recesses, measured in the circumferential direction of the tire, varies between about one times and about two times the aligned dimension, also measured in the circumferential direction of the tire, of the long arms of the L-shaped relief elements in accordance with the distance from the median plane and the depth at which the said recess dimension is measured.

8. The tire defined by claim 1 wherein the ends of the long arms of the L-shaped relief elements protrude laterally beyond the sidewalls of the tire.

9. The tire defined by claim 1 wherein the maximum width of the L-shaped relief elements, measured perpendicular to the direction of the arms, is between about 12 and 20 percent of the width of the tread.

* * * * *